US009625102B2

(12) United States Patent
Forkl, III et al.

(10) Patent No.: US 9,625,102 B2
(45) Date of Patent: Apr. 18, 2017

(54) SYSTEMS AND METHODS FOR CASCADING BURST DISCS

(71) Applicant: Avox Systems Inc., Lancaster, NY (US)

(72) Inventors: Frank J. Forkl, III, Lancaster, NY (US); Frank Dorogi, Lancaster, NY (US); Duard Charles Bennett, Lancaster, NY (US); Adam Fetzer, Lancaster, NY (US); Greg Gutekunst, Lancaster, NY (US)

(73) Assignee: AVOX SYSTEMS INC., Lancaster, NY (US)

( * ) Notice: Subject to any disclaimer, the term of this patent is extended or adjusted under 35 U.S.C. 154(b) by 0 days.

(21) Appl. No.: 14/519,956

(22) Filed: Oct. 21, 2014

(65) Prior Publication Data

US 2015/0107684 A1 Apr. 23, 2015

Related U.S. Application Data

(60) Provisional application No. 61/893,478, filed on Oct. 21, 2013.

(51) Int. Cl.

| | |
|---|---|
| ***F16K 17/14*** | (2006.01) |
| ***F17C 13/04*** | (2006.01) |
| ***F17C 13/06*** | (2006.01) |

(52) U.S. Cl.

CPC .............. *F17C 13/04* (2013.01); *F17C 13/06* (2013.01); *F17C 2205/0314* (2013.01);

(Continued)

(58) Field of Classification Search

CPC .. F17C 13/04; F17C 13/06; F17C 2205/0394; F17C 2205/0332; F17C 2205/0314;

(Continued)

(56) References Cited

U.S. PATENT DOCUMENTS

| | | | | |
|---|---|---|---|---|
| 864,079 | A * | 8/1907 | Coleman | F16K 17/16 137/68.23 |
| 1,485,913 | A | 3/1924 | Gottlieb | |

(Continued)

OTHER PUBLICATIONS

Paintball Gun Gas Cylinder—How to Invert a Mini Burst Disk, ehow.com, Mitchell Brock, Retrieved on Aug. 19, 2013 from http://www.ehow.com/how_12224228_invert-mini-burst-disk.html Aug. 19, 2013.

(Continued)

*Primary Examiner* — Matthew W Jellett
*Assistant Examiner* — Minh Le
(74) *Attorney, Agent, or Firm* — Hodgson Russ LLP

(57) ABSTRACT

Systems and methods are provided herein for gas storage and the safe release of gas using cascading burst discs. A vessel for storing gas is in pneumatic communication with a first flow path. A first burst disc is disposed in the first flow path such that gas flow is prevented when the disc is intact. A second flow path is in pneumatic communication with the first flow path and configured to receive gas flow when the first burst disc is ruptured. A second burst disc is disposed in the second flow path and configured to prevent a gas flow while the second burst disc is intact. At an operating pressure, the first burst disc may be punctured by an operator allowing normal use of the system. In the event of a gas overpressure, the first and second burst discs will rupture permitting safe release of the gas.

13 Claims, 4 Drawing Sheets

(52) U.S. Cl.
CPC ................. *F17C 2205/0332* (2013.01); *F17C 2205/0394* (2013.01); *Y10T 137/1714* (2015.04)

(58) Field of Classification Search
CPC ......... Y10T 137/1714; Y10T 137/1759; Y10T 137/1767; Y10T 137/7794; Y10T 137/87917
USPC ..... 137/68.23, 68.29, 68.3, 505.11, 613, 614
See application file for complete search history.

(56) References Cited

U.S. PATENT DOCUMENTS 1,781,027 A 11/1930 Mapes
1,781,854 A 11/1930 Mapes
2,106,176 A * 1/1938 Huffman ................. F16K 31/56 137/625
2,206,818 A * 7/1940 Mapes ............... A62C 99/0027 137/68.3
2,441,011 A * 5/1948 Dodelin .................. F16K 13/06 137/68.13
2,684,180 A * 7/1954 Allen ...................... F16K 13/04 137/68.23
2,788,794 A * 4/1957 Holinger ................. F16K 17/16 137/613
2,895,492 A * 7/1959 Bell ........................ F16K 17/16 137/340
3,087,643 A * 4/1963 Smirra .................... F16K 13/04 137/68.27
3,404,698 A * 10/1968 Rouse ..................... F16K 17/16 137/588
3,413,992 A * 12/1968 Yahle ................... A62C 13/003 137/68.13
3,561,477 A * 2/1971 Pinto ................... B63C 11/2209 137/505.25
3,827,449 A * 8/1974 Gurizzan ................ F16K 13/04 137/68.19
3,902,515 A * 9/1975 Douglas ................... B01J 3/002 137/68.22
3,913,604 A * 10/1975 Hanson ...................... B01J 7/00 137/68.13
4,085,764 A 4/1978 Raidl
4,126,184 A * 11/1978 Hinrichs ................ A62C 35/08 137/68.13
4,263,929 A 4/1981 Kearney
4,580,589 A * 4/1986 Le Bras .................. F16K 13/04 137/68.25
5,076,312 A * 12/1991 Powell .................. B60R 21/268 137/68.25
5,161,738 A * 11/1992 Wass ..................... F16K 17/383 137/68.29
5,413,136 A * 5/1995 Prescott .................... F16K 7/10 137/362
5,761,261 A * 6/1998 Karrh .................... F16K 17/162 137/68.23
5,762,368 A 6/1998 Faigle et al.
5,957,119 A * 9/1999 Perry .................... F41B 11/723 124/73
6,098,548 A 8/2000 Rink et al.
6,148,841 A 11/2000 Davidson
6,206,026 B1 * 3/2001 Isaki ....................... F16K 1/305 137/240
6,206,414 B1 3/2001 Cook et al.
6,237,950 B1 5/2001 Cook et al.
6,260,571 B1 * 7/2001 Lind ......................... B63C 9/24 137/580
6,273,462 B1 8/2001 Faigle et al.
6,412,484 B1 7/2002 Izuchukwu et al.
6,532,947 B1 3/2003 Rosa et al.
6,637,450 B2 * 10/2003 Huang .................... F17C 13/04 124/74
6,742,538 B1 6/2004 Aderholt et al.
6,805,376 B2 10/2004 Mizuno
6,851,447 B1 * 2/2005 Carroll ................. G05D 16/103 137/505.25
6,910,602 B2 * 6/2005 Hasaka ................... F17C 13/04 222/189.1
7,059,343 B2 * 6/2006 Carroll ................... G06Q 10/10 137/505.25
7,143,776 B2 12/2006 Sundholm
7,393,008 B2 7/2008 DiGangi et al.
7,798,169 B2 * 9/2010 Tai .......................... F16K 1/307 137/505.28
8,052,169 B2 11/2011 Yano et al.
8,235,249 B2 * 8/2012 Hollars ................. F16K 17/383 137/68.12
9,163,736 B2 * 10/2015 Kyllingstad .......... E21B 21/106
2006/0196539 A1 9/2006 Raska et al.
2011/0210515 A1 9/2011 Sharp et al.

OTHER PUBLICATIONS

Rupture Disc 2—Introduction to Rupture Disks and Panels, Oseco, Retrieved on Aug. 19, 2014 from http://www.tempresco.com/intro.html Aug. 19, 2013.
BSB Systems Catalog—Special Applications and Preventative Maintenance, BSB Systems, Retrieved on Aug. 19, 2013 from http://www.bsbsystems.com/brochures/product_selection/77-1007_preventative_maintenance.pdf Aug. 19, 2013.
Rupture Disc 1—Tite-Seal and Screw Type Assemblies, Continental Disk Corporation, Retrieved on Aug. 19, 2013 from http://www.contdisc.com/IM_Uploads/DocLib_363_TiteSealScrewTypeAssemblies.pdf Aug. 19, 2013.

* cited by examiner

SYSTEMS AND METHODS FOR CASCADING BURST DISCS

CROSS-REFERENCE TO RELATED APPLICATIONS

This application claims priority to U.S. Provisional Application No. 61/893,478, filed on Oct. 21, 2013, the disclosure of which is incorporated herein by reference.

FIELD OF THE DISCLOSURE

The disclosure generally relates to systems and methods for storing high-pressure gas, and more particularly, to burst discs for systems storing high-pressure gas.

BACKGROUND OF THE DISCLOSURE

Gas storage at high pressure may require a non-resealable mechanism to release the gas and prevent rupture of the gas storage unit in the event of overpressurization. Overpressurization can be caused by changes in surrounding temperature or an overfill of the gas storage unit. For example, a nearby fire may change the surrounding temperature proximate the gas storage unit. Without a gas release mechanism in such a situation, the gas storage unit may rupture and cause significant damage to the surroundings or harm to nearby people.

Moving seals and valves have been used to direct the flow of released gas in the event of overpressurization and to guide the flow to flow paths of adequate size for timely discharge of the pressure. However, these moving seals and valves contain moving parts that increase the risk of failure or system fault. What is needed is a new system to allow released gas to flow out a flow path.

BRIEF SUMMARY OF THE DISCLOSURE

In an embodiment of the present disclosure, a gas storage system is provided. The gas storage system comprising a vessel configured for gas storage under a pressure and having a port; a first flow path in pneumatic communication with the port; a first burst disc disposed in the first flow path such that the gas flow in the first flow path is prevented by the first burst disc, and the first burst disc configured to permit gas flow at a first burst pressure; a second flow path in pneumatic communication with the first flow path, downstream from the first burst disc; and a second burst disc disposed in the second flow path such that gas flow in the second flow path is prevented by the second burst disc, the second burst disc configured to permit gas flow at a second burst pressure, which is less than the first burst pressure.

In another embodiment of the present disclosure, a regulator for a gas storage system is provided. The regulator comprising a first flow path configured to be in pneumatic communication with a port of a vessel; a first burst disc disposed in the first flow path such that the gas flow in the first flow path is prevented by the first burst disc, and the first burst disc configured to permit gas flow at a first burst pressure; a second flow path in pneumatic communication with the first flow path, downstream from the first burst disc; and a second burst disc disposed in the second flow path such that gas flow in the second flow path is prevented by the second burst disc, the second burst disc configured to permit gas flow at a second burst pressure.

In another embodiment of the present disclosure, a method for providing a gas is disclosed. The method comprising providing a gas flow through a first burst disc along a first flow path, wherein a pressure for the gas flow is at a first value and a second burst disc along a second flow path connected to the first flow path remains intact; increasing the pressure to a second value higher than the first value; and bursting the second burst disc when the pressure is at the second value.

In another embodiment of the present disclosure, a method for overpressure gas release is provided. The method comprises storing a gas in a gas storage unit connected to a first burst disc and a second burst disc downstream of the first burst disc, wherein a pressure for the gas is at a first value and the first burst disc and the second burst disc remain intact; causing the pressure to increase to a second value higher than the first value; bursting the first burst disc when the pressure is at the second value; and bursting the second burst disc after the first burst disc when the pressure is at the second value.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

A burst disc, also known as a rupture disc or a burst diaphragm, is a non-resealable pressure relief device, configured to prevent gas flow through a channel when intact, and to permit gas flow when ruptured (for example, through operator action or due to overpressure). Burst discs provide quick response to changes in temperature or pressure. In one example, the response may be within milliseconds. Burst discs are reliable, resistant to leaks, and low cost. Burst discs may be used, for example, in applications where high pressure gas is stored and the system is non-refillable or non-reusable.

Figure 1:
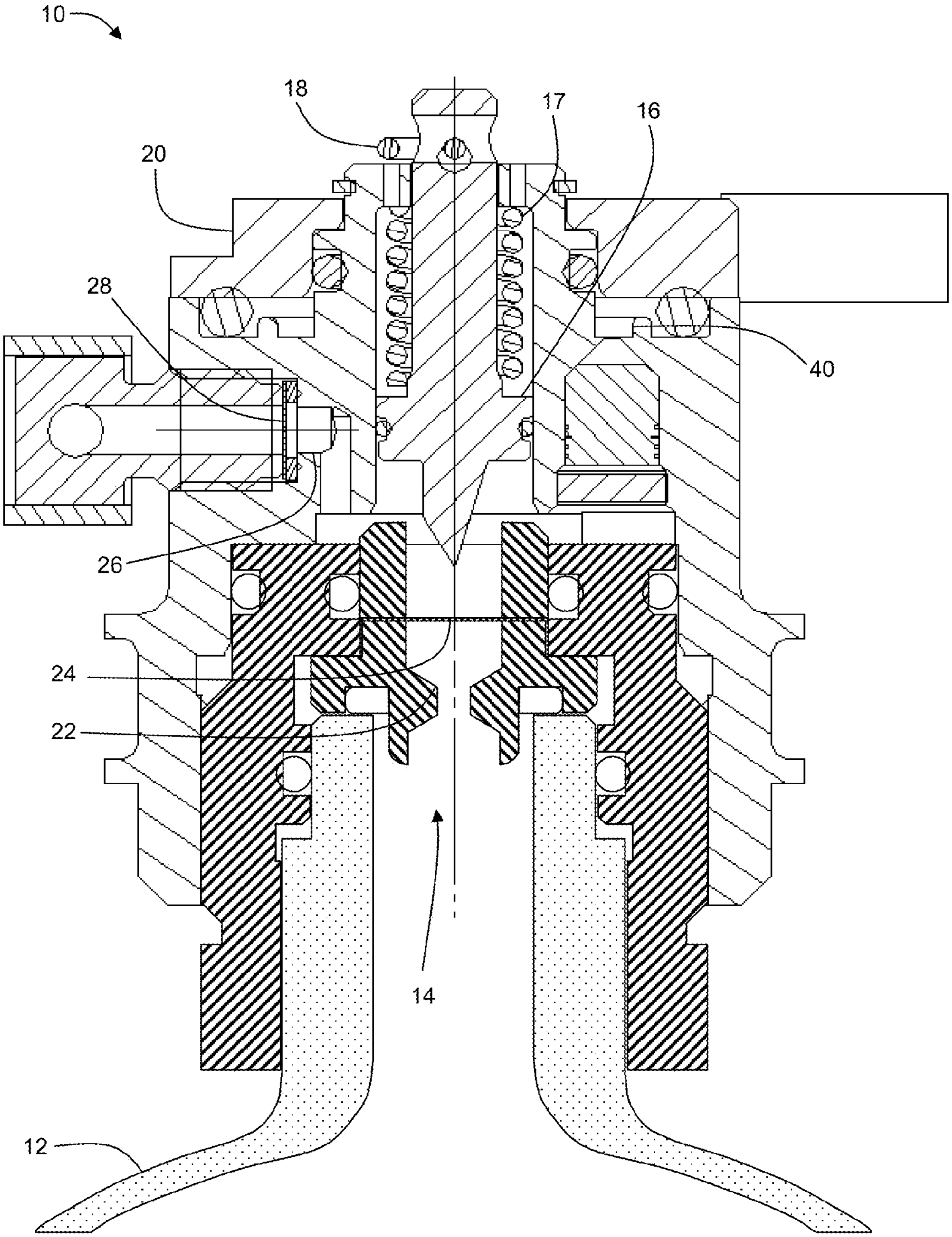
FIG. 1 is a cross-sectional view of a gas storage system according to an embodiment of the present disclosure.

FIG. 1 is a cross-sectional diagram of an embodiment using cascading burst discs. The gas storage system 10 includes a gas storage unit 12 (i.e., a vessel) having a port 14. The vessel 12 may be, for example, a tank, cartridge, cylinder, bottle, or other sealable container that stores gas. The vessel 12 may contain oxygen, argon, other noble gases, nitrogen, air, other inert gases, or other gases known to those skilled in the art.

The system 10 comprises a regulator 20 having a first flow path 22 in pneumatic communication with the port 14 of the vessel 12. The first flow path 22 may be configured to direct a release of gas from the vessel 12 to a breathing mask or system. A first burst disc 24 is disposed in the first flow path 22 and configured to seal the gas flow path 22 such that no gas flow is possible when the first burst disc 24 is intact. The first burst disc 24 has a first burst pressure at which the disc 24 will rupture. The first burst pressure may be configured to be some pressure greater than a maximum pressure of the vessel 12. For example, the first burst pressure may be 1.5 times, 1.75 times, or 2 times the maximum rated pressure of the vessel 12. In other embodiments, the first burst pressure is greater than the operating pressure of the system 10. For example, if the system 10 is designed to operate by providing breathing gas to an air passenger at an operating pressure, the first burst disc 24 can be configured to burst at a first burst pressure which is greater than the operating pressure.

Figure 2:
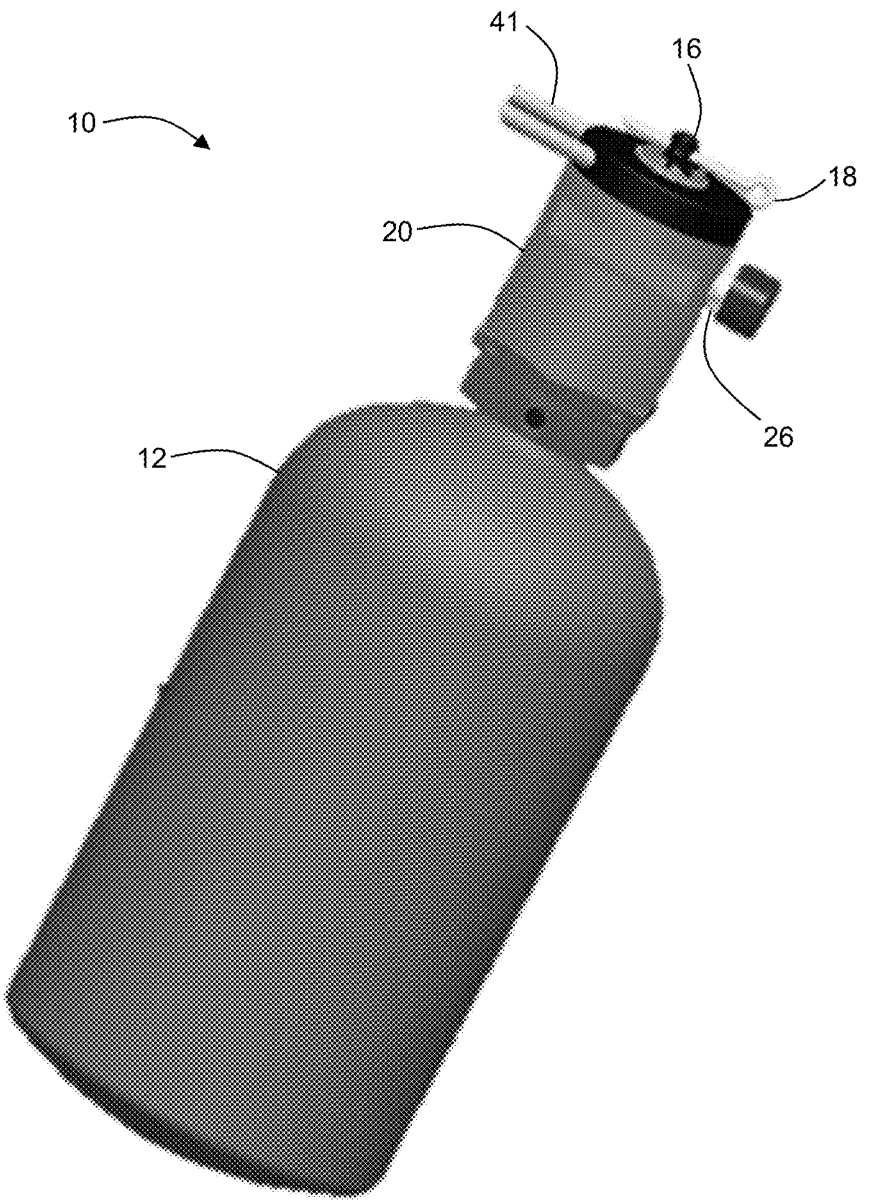
FIG. 2 is a perspective view of the gas storage system of FIG. 1.

The system 10 may comprise a striker (deliberate gas release device 16) configured to pierce the first burst disc 24 upon action by an operator or an actuator. In the embodiment depicted in FIGS. 1 and 2, striker 16 is configured with a pre-loaded biasing spring 17, and a pin 18 is used to maintain the spring load. In this manner, once the pin 18 is removed, the spring 17 causes the striker 16 to pierce the first burst disc 24 such that gas may flow through the first flow path 22. The gas may flow through the first flow path 22 to a third flow path 40 (i.e., the output 41 to a mask or other system/device), which may be a part of the first flow path 22. This usage may be considers "normal use" or "deliberate release."

The regulator 20 comprises a second flow path 26 in pneumatic communication with the first flow path 22 and downstream from the first burst disc 24 (i.e., on the opposite side of the first burst disc 24 from the vessel 12). A second burst disc 28 is disposed in the second flow path 26 such that gas flow is prevented through the second flow path 26 when the disc 28 is intact.

Flow through the third flow path 40 may be restricted because the third flow path 40 may have dimensions that are configured to provide a lower flow rate than that of the second flow path 26. In other embodiments, the third flow path 40 has a further pressure regulator or other device to limit the operating pressure of the system 10. This restriction of the operating pressure may be designed for the particular application for which the system 10 is used. However, in an emergency, such as, for example, a rupture of the first burst disc 24 due to an overpressure of the vessel 12, the third flow path 40 may have inadequate flow capacity to enable gas release or may have insufficient volume to ensure safe gas release. The third flow path 40 may have a discharge location or other drawbacks that makes it undesirable for gas release in an emergency.

In such an event, where the gas is released as a result of the first burst disc 24 rupturing due to an overpressure in the vessel 12, the high gas pressure will rupture the second burst disc 28 and the gas is vented through the second flow path 26. The diameter or other dimensions of the second flow path 26 may be configured to enable venting within a certain period of time or meet other specifications. For example, at a given test pressure, such as 100 psia, the second flow path 26 may need to enable flow at a minimum rate which is a function of the size of the vessel 12. The requirements for venting through the second flow path 26 may be set by, for example, trade groups or governmental organizations.

The first flow path 22 and second flow path 26 may be pipes, conduits, channels formed into the regulator 20, etc. The first flow path 22 and second flow path 26 may be angled or may contain other parts or components. Thus, the actual flow geometry can vary as will be apparent to those skilled in the art in light of the present disclosure. A connection between the first flow path 22 and second flow path 26 may be perpendicular or at other angles.

A first burst disc 24 is positioned in the first flow path 22. This first burst disc 24 is exposed to the gas stored in the gas storage unit 12. The first burst disc 24 has a first burst pressure at which it will burst or otherwise rupture or break. In some embodiments, the first burst disc 24 may be part of an assembly. Such an assembly may be integral to the seal or cap of the gas storage unit 12 or may be integral to the gas storage unit 12 itself.

A second burst disc 28 is positioned in the second flow path 26. This second burst disc 28 is downstream of the first burst disc 24 with respect to gas flow from the vessel 12. The second burst disc 28 has a second burst pressure at which it will burst or otherwise rupture or break that is lower than the first burst pressure. Thus, the second burst disc 28 will burst at a lower pressure than the first burst disc 24. The second burst disc 28 may be unpressurized until gas in the gas storage unit 12 is released through or into the first flow path 22 (and, where present, the third flow path 40). The second burst disc 28 is designed to hold integrity when exposed to normal operating pressures, such as when gas is flowing through the first flow path 22 after it is released from the gas storage unit 12. In some embodiments, the second burst disc 28 may be part of an assembly. This assembly may be part of the second flow path 26.

While illustrated as approximately flat, the first burst disc 24 and second burst disc 28 may be domed, curved, or other shapes. A dome shape may help ensure bursting at a particular pressure and the peak of the dome may be pointed in either direction with respect to gas flow. The first burst disc 24 and second burst disc 28 may burst inward or outward with respect to gas flow. The first burst disc 24 or second burst disc 28 may be deliberately damaged in a manner such that it is weakened when burst pressure falls below the pressure in the gas storage unit 12 The first burst disc 24 and second burst disc 28 may fragment upon bursting or may remain attached upon bursting.

In the event of overpressurization in the gas storage unit 12, the first burst disc 24 will burst and then the second burst disc 28 will burst. Thus, the first burst disc 24 and second burst disc 28 are said to "cascade." Flow through the third flow path 40 may be insufficient to enable venting of the gas storage unit 12 during overpressurization or to prevent the second burst disc 28 from bursting. Thus, the gas may also be vented through the second flow path 26 past the second burst disc 28 after the first burst disc 24 and the second burst disc 28 both burst.

The gas storage system 10 is configured to have a maximum fill pressure (typically measured at a specific temperature) and a rated burst pressure. The rated burst pressure may be set by safety guidelines, such as 1.5 times greater than the maximum fill pressure in one example. The pressure at which the second burst disc 28 will burst may be between the maximum fill pressure and the burst pressure or the lower end of the range at which the first burst disc 24 will burst. The second burst disc 28 may burst below the rated burst pressure. This relationship ensures that if the first burst disc 24 has burst, that the second burst disc 28 also will burst in an overpressurization or other emergency situation. The first burst disc 24 may burst either below or above the rated burst pressure.

The burst pressure ranges for the first burst disc 24 and second burst disc 28 are selected based on the potential application for the gas storage unit 12. A group or lot of the first burst discs 24 and second burst discs 28 may be designed to burst in a particular range rather than at a particular value due to manufacturing tolerances.

While described with respect to pressure, the burst pressure for the first burst disc 24 and second burst disc 28 may be based on temperature because some materials used for the fabrication of the first burst disc 24 or second burst disc 28 may weaken at higher temperatures. The exact pressure or temperature at which the first burst disc 24 and second burst disc 28 will burst may vary based on the application in which the gas storage unit 12 is being used or design specifications.

In one particular example using oxygen, the maximum fill temperature for the gas storage unit 12 is approximately 3000 psig at 70° F. The rated burst pressure for the gas storage unit 12 is 1.5 times the maximum fill pressure, which is 4500 psi. The first burst disc 24 may have a lower burst limit at 4150 psig and an upper burst limit at 4725 psig, of which both pressures are at 70° F. The nominal burst pressure for the first burst disc 24 is 4500 psig. The second burst disc 28 may have a lower burst limit at 3900 psig and an upper burst limit at 4100 psig, of which both pressures are at 70° F.

The upper burst limit for the first burst disc 24 may exceed the maximum fill pressure for the gas storage unit 12. There may be an acceptable tolerance for this upper burst limit beyond the maximum fill pressure. The relationship between the first burst disc 24 and the rated burst pressure may vary with the application in which the gas storage unit 12 is being used. A nominal burst pressure for the first burst disc 24 may be the maximum fill pressure for the gas storage unit 12 in an example. There may be some manufacturing tolerance above or below this nominal burst pressure for the first burst disc 24. For example, approximately 105% of the maximum fill pressure may be allowable on the upper end and approximately 90% of the burst pressure may be allowable on the lower end. The exact tolerances may vary.

The first burst disc 24 and second burst disc 28 may be disposable or may be configured to have a single use. Each may be fabricated of metal, though other materials may be used. The first burst disc 24 and second burst disc 28 may have varying dimensions based on the material, application, maximum fill pressure of the gas storage unit 12, or the gas contained in the gas storage unit 12. In one example, the first burst disc 24 and second burst disc 28 are less than 0.125" in thickness, though other dimensions are possible. The metal used for the first burst disc 24 and second burst disc 28 may be selected to comply with safety regulations or may be selected in light of the gas being stored in the gas storage unit 12. For example, if oxygen is stored in the gas storage unit 12 then oxygen-safe metals such as brass or nickel alloys like Monel or Inconel may be used. Of course, other metals known to those skilled in the art also may be used depending on the application or gas being stored in the gas storage unit 12.

The first burst disc 24 and second burst disc 28 may weaken when exposed to heat. However, the relationship of the burst pressure range for the first burst disc 24 being above that of the second burst disc 28 may not change with any weakening. This may be caused by the use of similar materials or similar dimensions in the first burst disc 24 and second burst disc 28. Other designs may prevent changes to this relationship upon exposure to heat. For example, one of the first burst disc 24 and the second burst disc 28 may be scored. In one example, the first burst disc 24 is scored in an X-shape. Other designs are possible.

Some embodiments of the gas storage system 10 also includes a deliberate release device 16. This deliberate release device 16 is configured to deliberately puncture or otherwise form a hole in the first burst disc 24. In one instance, the deliberate release device 16 may be known as a striker, though other devices that do not puncture the first burst disc 24 are possible. While illustrated as an arrow in FIG. 1, the deliberate release device 24 may be a three-sided pyramid or other designs known to those skilled in the art. The deliberate release device 16 may be positioned on either side of or otherwise proximate the first burst disc 24. Thus, the deliberate release device 16 is not merely limited to the design illustrated in FIG. 1. For example, the deliberate release device 16 may deliberately puncture an embodiment of the first burst disc 24 that is domed at an angle that is not parallel to gas flow.

Puncturing or forming a hole in the first burst disc 24 will release the gas stored in the gas storage unit 12. This may be done on demand. In the event of a puncture or hole formation during normal operation, the second burst disc 28 will maintain integrity. However, in the event of overpressurization after the puncture or hole formation, the second burst disc 28 will burst.

The hole formed in the first burst disc 24 by the deliberate release device 16 may be circular or other shapes. The first burst disc 24 may be scored or may contain perforations to enable a desired gas flow through the first burst disc 24 in the event of a puncture or other hole formation. This scoring may enable the first burst disc 24 to "petal." Of course, the second burst disc 28 also may be scored or contain perforations. The first burst disc 24 may be configured to enable a desired gas flow rate through a hole or puncture if the deliberate release device 16 is disposed through or proximate the first burst disc 24.

The gas storage system 10 may be used for multiple applications that may require an emergency flow path or vent. For example, the gas storage system 10 may be used with an oxygen tank in an aerospace system, an argon tank used in a welding system, an air tank for diving applications, an oxygen tank in a medical system, or with single-use gas canisters used for manufacturing. Thus, the gas storage unit 12 may contain exotic or even toxic species used in, for example, semiconductor manufacturing. For toxic or other species, the second flow path 26 may be connected to various industrial hygiene systems to prevent damage to people, facilities, or the environment upon venting.

Use of burst discs simplifies the design of the seal for the gas storage system 10 while still meeting pertinent gas standards. Burst discs avoid the use of dynamic seals or 3-2 valves. This reduces complexity and part count, which increases reliability.

Figure 3:
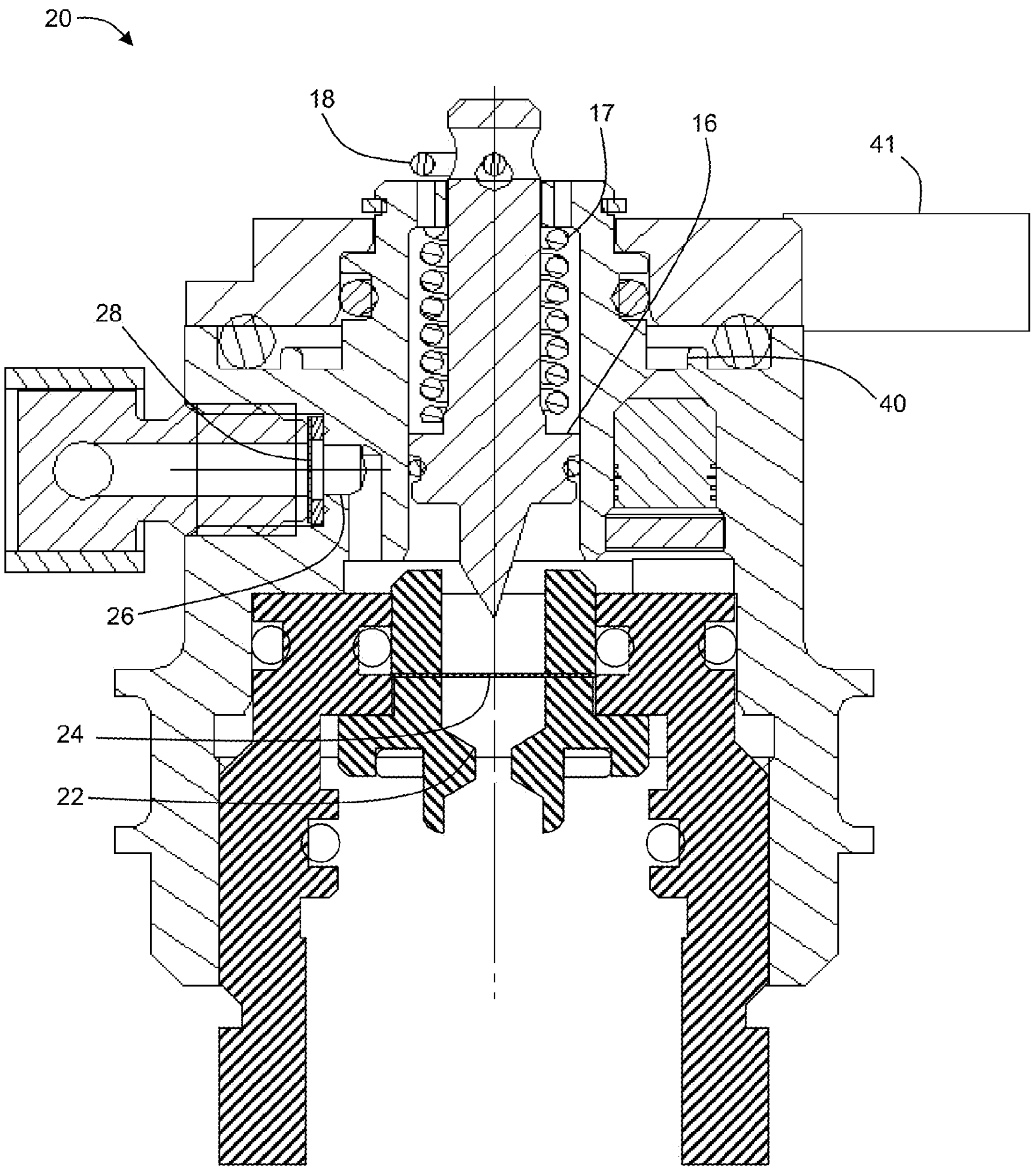
FIG. 3 depicts a gas regulator according to another embodiment of the present disclosure.

With reference to FIG. 3, the present disclosure may be embodied as a regulator 20 for use with a gas storage system (i.e., a regulator configured to be attached to a vessel). The regulator 20 may be similar to any of the embodiments of regulator 20 described above. In particular, the regulator 20 has a first flow path 22 configured to be in pneumatic communication with a port of a vessel. A first burst disc 24 is disposed in the first flow path 22 such that the gas flow in the first flow path 22 is prevented by the first burst disc 24 when the disc 24 is intact. The first burst disc 24 is configured to permit flow at a first burst pressure.

The regulator 20 has a second flow path 26 in pneumatic communication with the first flow path 22. The second flow path 26 is downstream from the first burst disc 24 with respect to gas flow when the regulator is connected to a vessel. A second burst disc 28 is disposed in the second flow path 26. In this way, gas flow through the second flow path 26 is prevented by the second burst disc 28 when the disc 28 is intact. The second burst disc 28 is configured to permit gas flow at a second burst pressure. The second burst pressure may be less than the first burst pressure.

Figure 4:
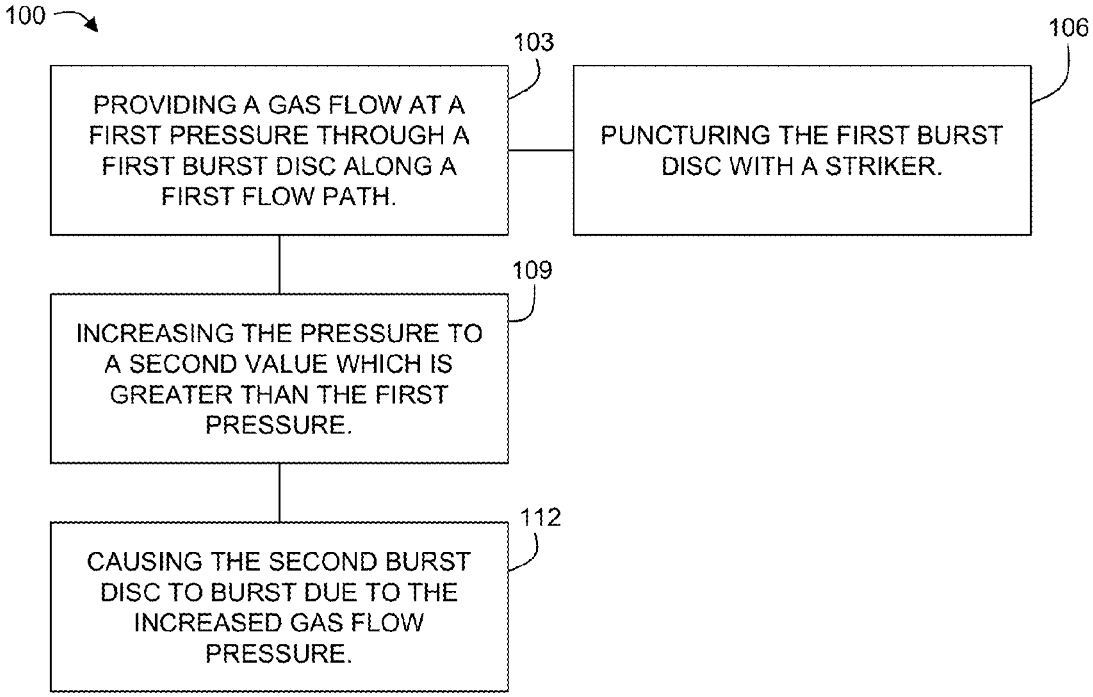
FIG. 4 is a flowchart of a method according to another embodiment of the present disclosure.

The present disclosure may be embodied as a method 100 for providing a gas (see, for example, FIG. 4). The method 100 comprises the step of providing 103 a gas flow through a first burst disc along a first flow path. The pressure of the gas flow is at a first value which is less than a burst pressure of the first burst disc or a second burst disc. In this way, the second burst disc remains intact. For example, the gas flow may be provided 103 by puncturing 106 the first burst disc with a striker. The pressure is increased 109 to a second value which is greater than the first value and greater than or equal to a burst pressure of the second burst disc, and the second burst disc ruptures (bursts) 112 due to the increased pressure.

Figure 5:
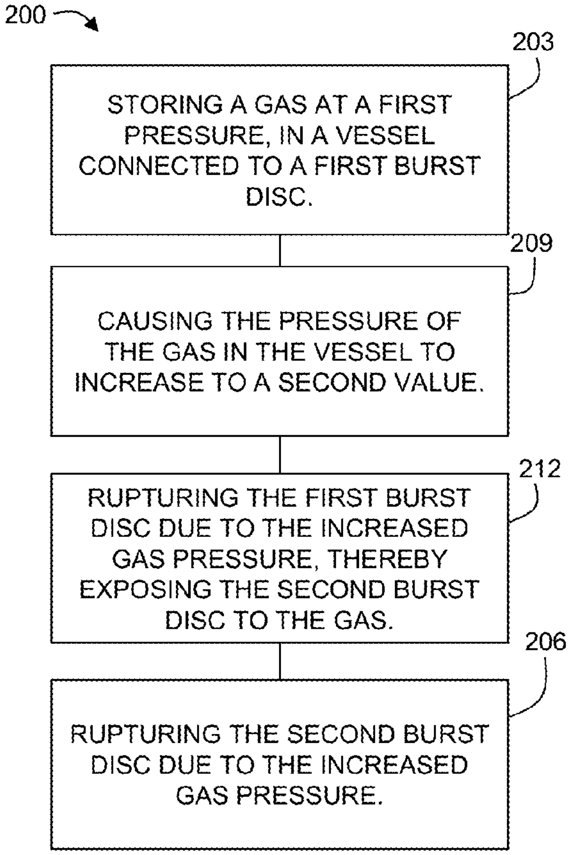
FIG. 5 is a flowchart of a method according to another embodiment of the present disclosure.

In other embodiments, a method 200 for overpressure gas release is provided (see, for example, FIG. 5). The method 200 comprises storing 203 a gas in a gas storage unit connected to a first burst disc. A second burst disc is provided downstream of the first burst disc such that the second burst disc is not exposed to the gas while the first burst disc is intact. The gas pressure is at a first value which is less than a burst pressure of the first and second burst discs. In this way, the first and second burst discs remain intact. The pressure is caused 206 to increase to a second value which is greater than the first value. The second value is also greater than or equal to the burst pressure of the first and second burst discs. The first burst disc bursts 209 due to the pressure of the gas, permitting the gas to reach the second burst disc. The second burst disc bursts 212 due to the pressure of the gas.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

We claim:

1. A gas storage system, comprising:
- a vessel configured for gas storage under a pressure and having a port;
- a first flow path in pneumatic communication with the port;
- a first burst disc disposed in the first flow path such that a gas flow from the vessel in the first flow path is prevented by the first burst disc,
- a second flow path in pneumatic communication with the first flow path, downstream from the first burst disc with respect to the gas flow, wherein the first burst disc is configured to burst at a first burst pressure only in the first flow path; and
- a second burst disc disposed in the second flow path such that gas flow from the first flow path to the second flow path is prevented by the second burst disc, the second burst disc configured to burst at a second burst pressure in the second flow path, wherein the second burst pressure is less than the first burst pressure.

2. The gas storage system of claim 1, further comprising a release device configured to form a hole in the first burst disc.

3. The gas storage system of claim 1, wherein the vessel is a bottle.

4. The gas storage system of claim 1, wherein the second flow path is a vent.

5. The gas storage system of claim 1, wherein the first burst disc and the second burst disc are fabricated of a metal.

6. The gas storage system of claim 5, wherein the metal is selected from the group consisting of brass and a nickel alloy.

7. The gas storage system of claim 1, wherein the first flow path has dimensions that are configured to provide a smaller flow rate than that of the second flow path.

8. The gas storage system of claim 1, wherein the first burst pressure comprises a first burst pressure range and the second burst pressure comprises a second burst pressure range, and wherein the second burst pressure range is less than the first burst pressure range.

9. The gas storage system of claim 1, wherein the second burst pressure is between the first burst pressure and a maximum fill pressure for the vessel.

10. A regulator for a gas storage system, comprising:
- a first flow path configured to be in pneumatic communication with a port of a vessel;
- a first burst disc disposed in the first flow path such that a gas flow from the vessel in the first flow path is prevented by the first burst disc;
- a second flow path in pneumatic communication with the first flow path, downstream from the first burst disc with respect to the gas flow, the first burst disc configured to burst at a first burst pressure only in the first flow path; and
- a second burst disc disposed in the second flow path such that the gas flow from the vessel in the second flow path is prevented by the second burst disc, the second burst disc configured to burst at a second burst pressure in the second flow path;
- wherein the second burst pressure is less than the first burst pressure.

11. The regulator of claim 10, further comprising a release device configured to form a hole in the first burst disc.

12. A method comprising:
- providing a gas flow through a first burst disc along a first flow path and along a second flow path connected to the first flow path downstream of the first burst disc by puncturing the first disc, wherein a pressure of the gas flow is at a first value and a second burst disc remains intact, wherein the first burst disc is configured to burst at a first burst pressure only in the first flow path and the second burst disc is configured to burst at a second value higher than the first value;
- increasing the pressure of the gas flow to the second value; and
- bursting the second burst disc when the pressure is at the second value;
- wherein the second value is less than the first burst pressure.

13. A method comprising:
- storing a gas in a gas storage unit connected to a flow path having a first burst disc and a second burst disc downstream of the first burst disc with respect to the gas storage unit, wherein a pressure of the gas is at a first value and the first burst disc and the second burst disc remain intact;
- causing the pressure of the gas in the gas storage unit to increase to a second value higher than the first value;
- bursting the first burst disc by only the pressure of the gas in the gas storage unit at the second value; and
- bursting the second burst disc after the first burst disc when the pressure is at the second value;
- wherein the second burst disc is configured to burst at a burst pressure less than the second value.

* * * * *